United States Patent [19]

Bernaerts

[11] 3,912,038

[45] Oct. 14, 1975

[54] AIR CUSHION WHEEL

[76] Inventor: Henry J. Bernaerts, R.F.D. 10, Box 1610, Annapolis, Md. 21401

[22] Filed: Nov. 5, 1973

[21] Appl. No.: 413,105

[52] U.S. Cl. ............... 180/126; 115/1 R; 180/1 R; 180/7 R; 180/116; 180/128
[51] Int. Cl.² ............................................ B60V 3/02
[58] Field of Search ........... 180/116, 127, 126, 128, 180/7 R, 1 R; 115/1 R

[56] References Cited
UNITED STATES PATENTS

| | | | |
|---|---|---|---|
| 2,998,996 | 9/1961 | Aghnides | 180/7 R |
| 3,001,601 | 9/1961 | Aghnides | 180/7 R |
| 3,107,643 | 10/1963 | Edwards | 115/1 |
| 3,182,739 | 5/1965 | Cockerell | 180/128 |
| 3,251,430 | 5/1966 | Veryzer | 180/7 R |
| 3,279,416 | 10/1966 | Cockerell | 180/126 |
| 3,767,221 | 10/1973 | Asberg | 280/96.1 |

FOREIGN PATENTS OR APPLICATIONS 972,068  10/1964  United Kingdom................ 180/127

*Primary Examiner*—Leo Friaglia
*Assistant Examiner*—John P. Silverstrim
*Attorney, Agent, or Firm*—R. S. Sciascia; Q. E. Hodges; O. M. Wildensteiner

[57] ABSTRACT

A vehicle supporting wheel having an air cushion skirt on one side and air supply means in its hub. To convert from a wheel to an air cushion pad, the wheel hub is rotated 90° to bring the skirt in contact with the ground, and air is then supplied to the chamber defined by the skirt.

15 Claims, 5 Drawing Figures

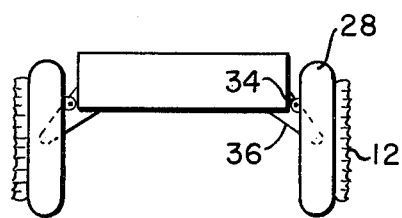
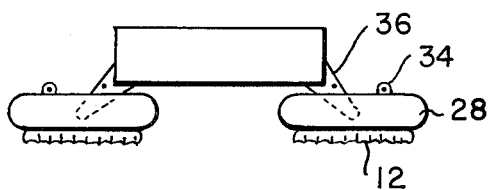
FIG. 1.
FIG. 2.
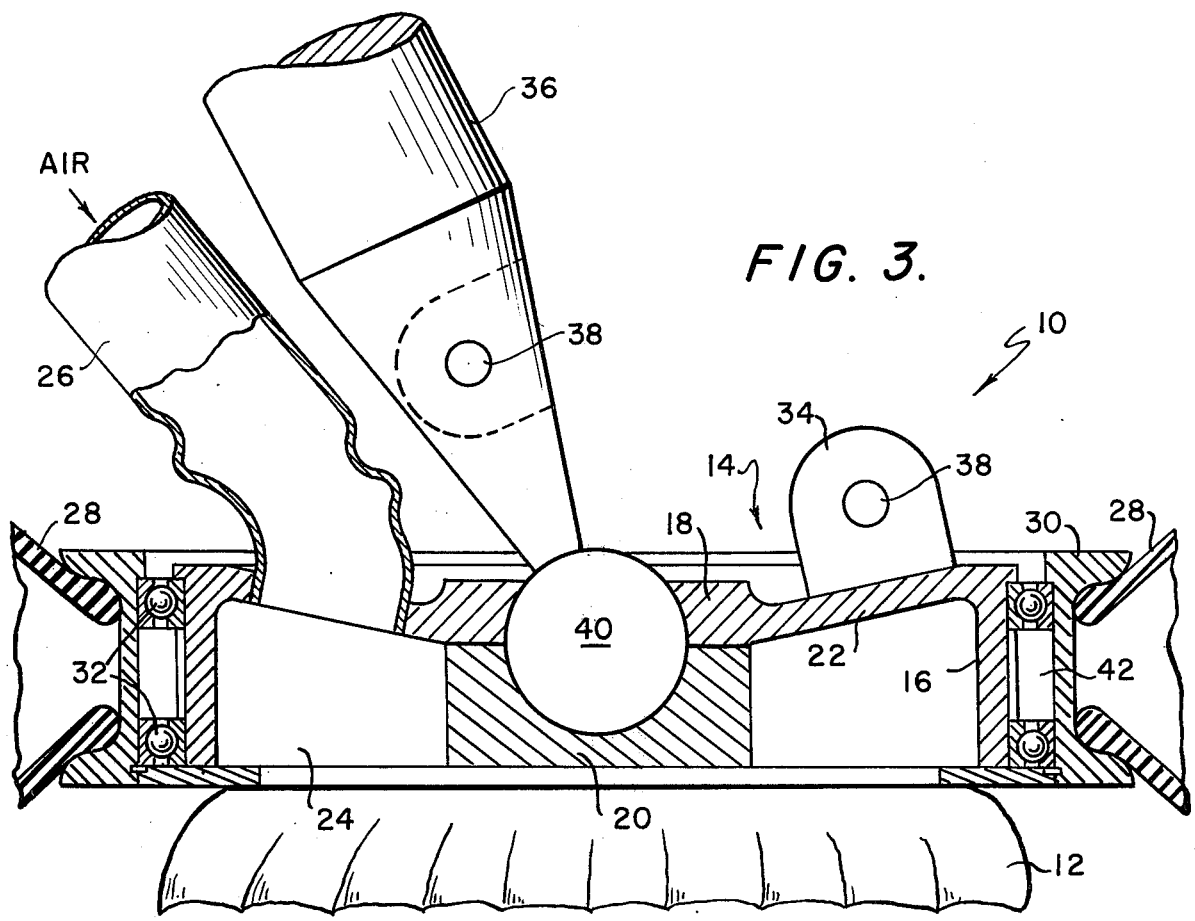
FIG. 3.

AIR CUSHION WHEEL

The invention described herein may be manufactured and used by or for the Government of the United States of America for governmental purposes without the payment of any royalties thereon or therefor.

BACKGROUND

The present invention is in that class of vehicle supports which can operate in more than one fashion. There are many uses for such devices; for example, an airplane landing wheel that could be converted to a ski configuration would allow the airplane to land on snow. An off-the-road capability would be built into any vehicle whose conventional running gear could be converted to a tracked configuration.

The most desirable combination of supports is a wheel and an air cushion pad. A wheel supports a vehicle on a hard surface with no energy input, while an air cushion pad will allow the vehicle to travel over water, snow, sand, etc. although requiring some energy input to maintain the cushion of air. Such a device when used on an airplane would allow it to land on any surface except water (unless the air cushion pads were made impractically large); the pilot would select the wheel configuration for a hard surface runway, and the air cushion pad for snow, sand, etc. Field artillery pieces have been abandoned in muddy areas when towing vehicles could not approach them; a wheel that converts to an air cushion pad would allow the artillery piece to be retrieved from deep mud. Additionally, the air cushion could be utilized as part of the recoil-absorbing system for the artillery piece. Running gear of this type would also be ideally suited for use on vehicles used in the Arctic regions; the wheel configuration would be used on packed snow and ice, and the air cushion pad would be used on loose snow.

The prior art shows many air cushion pads, but none which are combined with conventional wheels. Air lift casters, wherein a spherical ball rides within a hemispherical housing on a film of air, are also well known to the art; however, these are impractical for use on soft terrain because the weight is concentrated at the point of contact of the sphere with the ground rather than being spread out over a large area.

SUMMARY OF THE INVENTION

The present invention is an air cushion pad that is an integral part of a wheel assembly. The wheel is on a relatively large diameter hub, the non-rolling part of which is exposed. Attached to this non-rolling part of the hub is a flexible skirt which defines an air cushion chamber when the wheel hub is rotated 90° to bring the skirt in contact with the ground. Air or other fluid is then fed to the chamber to form the air cushion.

OBJECTS OF THE INVENTION

Accordingly, it is an object of the present invention to provide a vehicle wheel that can be converted to a different type of vehicle support.

It is a further object of the present invention to provide a convertible vehicle support whose operational position can be changed at will.

It is a further object of the present invention to provide a wheel that can be converted to or from an air cushion pad.

Other objects and advantages of the present invention will be apparent from the following specification and accompanying drawings.

BRIEF DESCRIPTION OF THE DRAWINGS

FIG. 1 is a front view of a vehicle showing the vehicle supports in the wheel position;

FIG. 2 is a front view of a vehicle showing the vehicle supports in the air cushion pad position; and FIG. 3 is a sectional view, looking parallel to the axis of the vehicle, of the convertible vehicle support of the present invention.

DESCRIPTION OF THE PREFERRED EMBODIMENT

Figure 4:
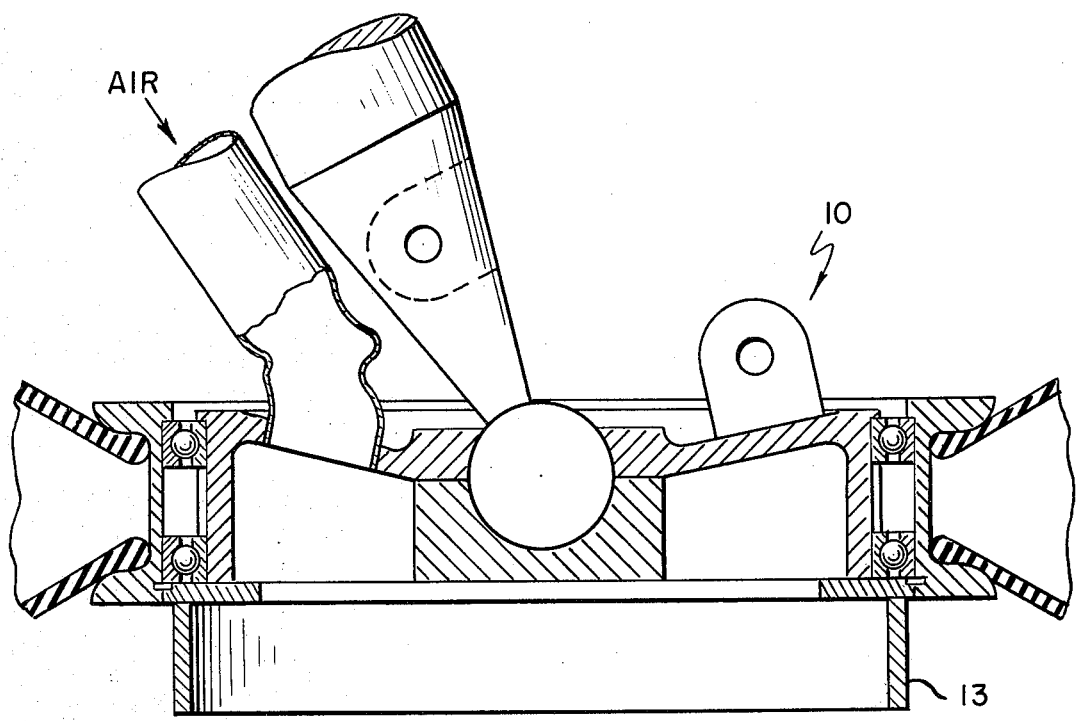
FIG. 4 shows a rigid skirt attached to the non-rolling part of the wheel hub.
Figure 5:
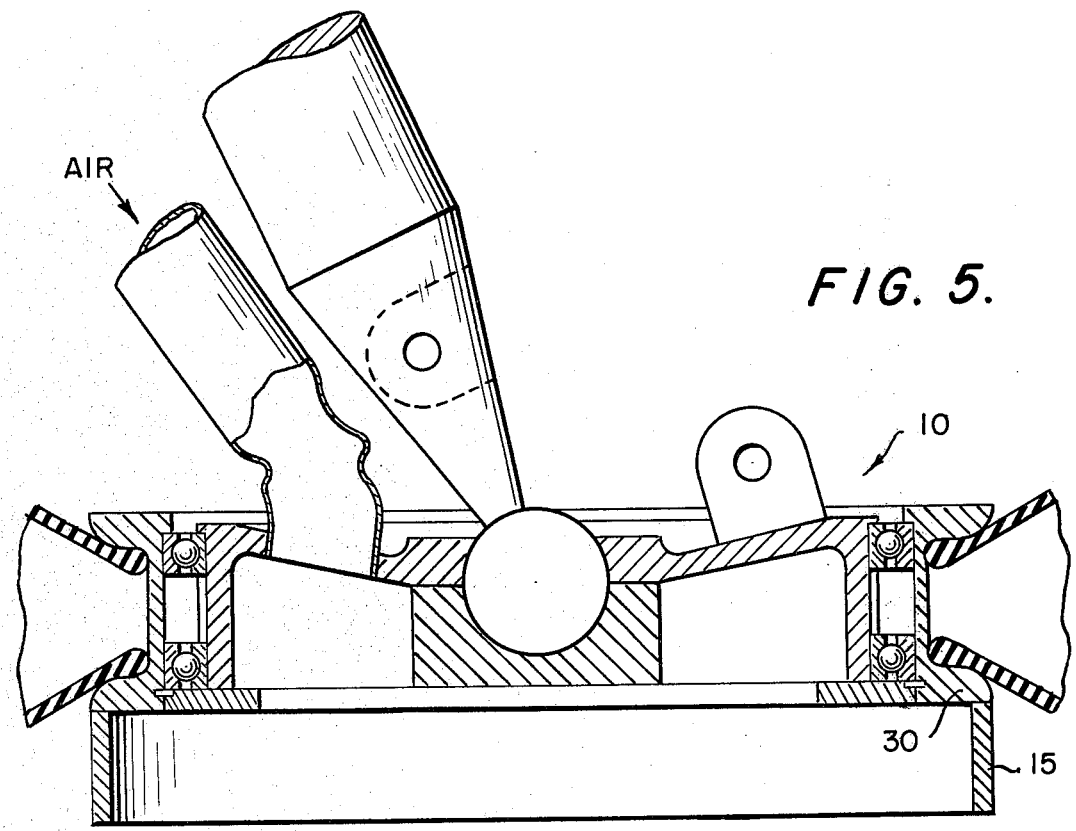
FIG. 5 shows a rigid skirt attached to the rolling wheel assembly.

FIG. 3, which is a cross section view of the device of the present invention, shows the vehicle support 10 in the air cushion pad position. Skirt 12 is shown as being attached to the stationary part of the hub in order that it will not be subjected to any centrifugal stresses when the device is used in the wheel position; however, for some applications it may be desirable to get as great a skirt diameter as possible, hence it might be necessary to attach the skirt to the rotating part of the wheel assembly. Skirt 12 can be made of any conventional air cushion skirt material and can be flexible or rigid, depending on the requirements of each particular application. FIG. 4 shows a rigid skirt 13 attached to the non-rolling part of the wheel hub, and FIG. 5 shows a rigid skirt 15 attached to the rolling part of the wheel assembly. It could also be removable, stowable, or retractable.

The non-rolling hub 14 is comprised of a circumferential portion 16 and central portions 18 and 20, which are joined by a convex disc portion 22. Hub 14 will thus be seen to form a plenum 24. Plenum 24 is fed air or other fluid through duct 26, which is shown as a flexible conduit; however, any suitable means may be used to pressurize plenum 24.

Tire 28, which may be of any construction, is retained on rim 30 in the conventional manner. Rim 30 is rotatably joined to non-rolling hub 14 by conventional ball or roller bearings 32. When skirt 12 is attached to hub 14 as shown in FIG. 3, bearings 32 do not need to be thrust bearings since there is no appreciable lateral force on them in the air cushion pad position. However, if the skirt is mounted on rim 30, bearings 32 will have to support a portion of the weight of the vehicle in the air cushion pad configuration and some type of thrust bearing may have to be included.

Convex disc 22 has a lug 34 on it which fits into a slot in support strut 36. A locking pin (not shown), which is inserted into holes 38 in the strut and lug, is used to lock the vehicle support in the wheel position as will be explained later.

Support strut 36 terminates in a spherical pivot 40 which is clamped between central portions 18 and 20 of hub 14. Spherical pivot 40 allows the vehicle support to pivot freely when in the air cushion pad position, as will be explained later.

The annular gap 42 between rim 30 and circumferential portion 16 of hub 14 can be expanded to provide for the inclusion of a brake mechanism (for use when the support is in the wheel position), if this is desired. Since hub 14 does not rotate while the wheel is rolling, a conventional drum brake mechanism can be incorporated.

Operation of the device is as follows, assuming that it is in the wheel position. The vehicle is raised up so that all weight is removed from one of the wheels. The locking pin is removed from holes 38, and the assembly is rotated to bring the axis of rotation of the wheel vertical. Then the vehicle is lowered until it is resting on the deflated air cushion pad. Spherical pivot 40 allows the pad to rest flat on the ground even though the ground beneath it is sloping at an angle that is different from that of the ground beneath the other pads. Thus the vehicle can traverse uneven terrain without losing the air cushion from any of the pads.

When all vehicle supports have been converted to the air cushion pad position and the vehicle is resting on them, the air or other fluid supply system is started and the vehicle is supported on the cushion of air.

To convert the vehicle support back to the wheel position, the entire vehicle or each individual support strut is again raised to allow the support to pivot freely. Lug 34 is then slipped into the slot in strut 36, and the locking pin is placed in holes 38; the support then functions like a conventional wheel.

Obviously a hydraulic cylinder, four bar linkage, or other extensible member could be used to rotate the vehicle support from one position to the other and lock it in place. This would be utilized in an aircraft, for example, thereby allowing the pilot to choose which type of landing gear he needed just before landing.

Obviously many modifications and variations of the present invention are possible in the light of the above teachings. It is therefore to be understood that within the scope of the appended claims the invention may be practiced otherwise than as specifically described. In the appended claims the phrase "air cushion member" is to be interpreted in the usual sense as referring to a chamber that is closed on all sides except that which is parallel to the surface on which the chamber is resting, and which is constantly supplied with air or other fluid under pressure. The phrase specifically does not include a conventional pneumatic tire. The phrase "air cushion pad" refers to an air cushion chamber that is on a strut or other appendage and is smaller than the vehicle to which it is attached.

What is claimed is:
1. A vehicle support comprising:
a hub;
a wheel surrounding said hub and mounted to said hub for rotation independently thereof; and
means defining an open air cushion chamber on one of said wheel and said hub such that said vehicle support can be utilized as either a wheel or an air cushion pad.

2. A vehicle support as in claim 1 wherein said hub includes means for allowing it to assume a plurality of positions.

3. A vehicle support as in claim 2 wherein one of said positions is that wherein the axis of rotation of said wheel is parallel to the surface on which said support is resting.

4. A vehicle support as in claim 3 wherein one of said positions is that wherein the axis of rotation of said wheel is perpendicular to the surface on which said support is resting.

5. A vehicle support as in claim 2 including fluid supply means in said hub.

6. A vehicle support as in claim 5 wherein said air cushion chamber defining means is a flexible skirt.

7. A vehicle support as in claim 5 wherein said air cushion chamber defining means is a rigid member.

8. A vehicle support as in claim 5 wherein said air cushion chamber defining means is mounted on said hub.

9. A vehicle support as in claim 5 wherein said air cushion chamber defining means is mounted on said wheel.

10. A vehicle support comprising:
a hub;
a wheel surrounding said hub and mounted to said hub for rotation independently thereof;
means defining an air cushion chamber on said wheel and said hub assembly such that said vehicle support can be utilized as either a wheel or an air cushion pad;
means for positioning said wheel to support the vehicle; and
means providing air to said air cushion chamber when in its air cushion support position.

11. A vehicle support as in claim 10 wherein said hub includes means for placing and securing said hub in a plurality of positions.

12. A vehicle support as in claim 11 wherein said hub is secured in a position such that the axis of rotation of said wheel is parallel to the surface on which said support is resting for wheel operation of the vehicle.

13. A vehicle support as in claim 12 wherein said hub is secured in a position such that the axis of rotation of said wheel is perpendicular to the surface over which the vehicle is supported.

14. A vehicle support as in claim 10 wherein said air cushion chamber defining means is a flexible skirt attached to said wheel.

15. A vehicle support as in claim 10 wherein said air cushion chamber defining means is a rigid annular member attached to said wheel.

* * * * *